United States Patent
Zhang

(10) Patent No.: US 10,142,170 B2
(45) Date of Patent: Nov. 27, 2018

(54) LOG PROCESSING METHOD AND CLIENT

(71) Applicant: BEIJING QIHOO TECHNOLOGY COMPANY LIMITED, Beijing (CN)

(72) Inventor: Xinrun Zhang, Beijing (CN)

(73) Assignee: Beijing Qihoo Technology Comapany Limited, Beijing (CN)

( * ) Notice: Subject to any disclaimer, the term of this patent is extended or adjusted under 35 U.S.C. 154(b) by 84 days.

(21) Appl. No.: 15/100,188

(22) PCT Filed: Sep. 23, 2014

(86) PCT No.: PCT/CN2014/087188
§ 371 (c)(1),
(2) Date: May 27, 2016

(87) PCT Pub. No.: WO2015/078224
PCT Pub. Date: Jun. 4, 2015

(65) Prior Publication Data
US 2017/0005858 A1    Jan. 5, 2017

(30) Foreign Application Priority Data

Nov. 29, 2013  (CN) .......................... 2013 1 0629422

(51) Int. Cl.
*H04L 12/24* (2006.01)
*G06F 17/30* (2006.01)

(52) U.S. Cl.
CPC ...... *H04L 41/069* (2013.01); *G06F 17/30997* (2013.01); *H04L 41/0604* (2013.01); *H04L 41/0627* (2013.01)

(58) Field of Classification Search
CPC ................ G06Q 10/10; G06F 21/6218; G06F 17/30289; G06F 11/0709; G06F 11/0757;
(Continued)

(56) References Cited

U.S. PATENT DOCUMENTS 7,313,537 B1 *  12/2007  Burrell ................. G06Q 10/087
                                                        705/28
7,472,190 B2     12/2008  Robinson
(Continued)

FOREIGN PATENT DOCUMENTS

CN          101483557 A       7/2009
CN          101681288 A       3/2010
(Continued)

*Primary Examiner* — Ninos Donabed
(74) *Attorney, Agent, or Firm* — Baker & Hostetler LLP

(57) ABSTRACT

The present disclosure discloses a log processing method and client, the method includes: acquiring a log processing instruction, the log processing instruction including a user's identifier; controlling an operating state of a log record switch of the user corresponding to the user's identifier according to the log processing instruction, the operation state of the log record switch including an on state and an off state; when the operating state of the log record switch of the user is the on state, recording a log of the user; when the operating state of the log record switch of the user is the off state, not recording a log of the user. This avoids the overall performance of the system from being affected due to the logs of a large number of users who are being recorded by the server.

9 Claims, 5 Drawing Sheets

(58) Field of Classification Search
CPC ............ G06F 11/0769; G06F 11/0775; G06F 11/0781; G06F 11/0784; G06F 11/202; G06F 11/32; G06F 11/324; H04L 63/0428; Y10S 707/99931; Y10S 707/99939

See application file for complete search history.

(56) References Cited

U.S. PATENT DOCUMENTS

| | | | | |
|---|---|---|---|---|
| 2002/0054587 | A1* | 5/2002 | Baker | G06F 11/0709 370/352 |
| 2002/0129039 | A1* | 9/2002 | Majewski | G06Q 10/10 |
| 2005/0251531 | A1* | 11/2005 | Jen | A63F 13/12 |
| 2006/0015499 | A1* | 1/2006 | Clissold | G06F 17/30067 |
| 2006/0265418 | A1* | 11/2006 | Dolezal | G06Q 10/10 |
| 2007/0027868 | A1* | 2/2007 | Mohammed | G06Q 10/06 |
| 2008/0120302 | A1* | 5/2008 | Thompson | G06F 21/6209 |
| 2008/0124689 | A1* | 5/2008 | Williams | G09B 7/02 434/236 |
| 2008/0126276 | A1* | 5/2008 | Williams | G09B 19/00 706/14 |
| 2008/0126277 | A1* | 5/2008 | Williams | G06F 19/3481 706/14 |
| 2008/0208666 | A1* | 8/2008 | Dong | G06Q 10/06 705/80 |
| 2009/0050695 | A1* | 2/2009 | Ma | G06F 17/30595 235/382 |
| 2009/0138311 | A1* | 5/2009 | Iacovone | G06Q 10/06 705/7.17 |
| 2010/0035691 | A1* | 2/2010 | Wild | H04L 67/24 463/42 |
| 2010/0042351 | A1* | 2/2010 | Covey | G01N 15/1404 702/108 |
| 2010/0223557 | A1* | 9/2010 | Kenney | G06Q 10/10 715/736 |
| 2011/0154455 | A1* | 6/2011 | Nanjangudu | H04L 9/32 726/6 |
| 2011/0191303 | A1* | 8/2011 | Kaufman | G06F 17/30286 707/684 |
| 2013/0160084 | A1* | 6/2013 | Hansen | G06F 21/6227 726/4 |

FOREIGN PATENT DOCUMENTS

| | | |
|---|---|---|
| CN | 102799508 A | 11/2012 |
| CN | 103309792 A | 9/2013 |
| CN | 103645982 A | 3/2014 |

* cited by examiner

LOG PROCESSING METHOD AND CLIENT

CROSS-REFERENCE TO RELATED APPLICATIONS

The present disclosure is the national stage of International Application No. PCT/CN2014/087188 filed Sep. 23, 2014, which is based upon and claims priority to Chinese Patent Application No. CN201310629422.0, filed Nov. 29, 2013, the entire contents of which are incorporated herein by reference.

FIELD OF TECHNOLOGY

The present disclosure relates to the technical field of computers, and especially relates to a log processing method and a client.

BACKGROUND

During operation, a system in a server records some logs so as to assist a programmer in locating an in-system error when an issue arises in the system.

The server offers much higher performance than those used in ordinary home computers, and therefore a single server is generally expected to serve as many users as is required. In consideration of the performance, a quite lower log level is enabled in general in the operation of the server, and only some key events and errors are recorded in the logs. If there is a demand for checking more detailed logs of the system, a dynamic regulation on the log level of a server system is required.

However, when a large number of users establish connections with the server at the same time, detailed event records for some specified users are expected for the convenience of locating or finding a system issue. If the log level of the server is regulated in such a condition, logs of many unspecified users will be recorded. As a result, the overall performance of the system is affected, the system may even break down in severe cases, and the large amount of invalid logs generated will also have a big interfering effect on subsequent analysis.

SUMMARY

Given the problems above, the present disclosure provides a log processing method and a log processing client, which can solve, or at least partially solve, the above problems, and therefore the logs of some specified users may be processed.

According to an aspect of the present disclosure, there is provided log processing method including: acquiring a log processing instruction, the log processing instruction including a user's identifier; controlling an operating state of a log record switch of the user corresponding to the user's identifier according to the log processing instruction, the operation state of the log record switch including an on state and an off state; when the operating state of the log record switch of the user is the on state, recording a log of the user; when the operating state of the log record switch of the user is the off state, not recording a log of the user.

According to another aspect of the present disclosure, there is provided a computer program including computer readable code, when the computer readable code is executed on a computer, the log processing method above is performed.

According to another aspect of the present disclosure, there is provided a computer readable medium which stores the computer program above.

According to still another aspect of the present disclosure, there is provided a log processing client including: a log processing instruction acquiring module, configured to acquire a log processing instruction, the log processing instruction including a user's identifier; a log record switch control module, configured to control an operating state of a log record switch of the user corresponding to the user's identifier according to the log processing instruction, the operation state of the log record switch including an on state and an off state; a log record module, configured to record a log of the user when the operating state of the log record switch of the user is the on state; and not record the log of the user when the operating state of the log record switch of the user is the off state.

According to the above technical solution, embodiments of the present disclosure have the following beneficial effects: in embodiments of the present disclosure, an operating state of a log record switch of a user may be controlled based on a log processing instruction. When the operating state of the log record switch of the user is at the on state, a recording of a log of the user corresponding to the user's identifier starts or continues so as to realize detailed log a recording for a specified user. When the operating state of the log record switch of the user is at the off state, the recording of the log of the user corresponding to the user's identifier stops so as to prevent the overall performance of the system from being affected due to the logs of a large number of users who are being recorded by the server.

BRIEF DESCRIPTION OF THE DRAWINGS

Through reading the detailed description of the following preferred embodiments, various other advantages and benefits will become apparent to an ordinary person skilled in the art. Accompanying drawings are merely included for the purpose of illustrating the preferred embodiments and should not be considered as limiting of the invention. Further, throughout the drawings, same elements are indicated by same reference numbers. In the drawings.

DESCRIPTION OF THE EMBODIMENTS

Exemplary embodiments of the present disclosure will be described in detail with reference to the accompanying figures hereinafter. Although the exemplary embodiments of the disclosure are illustrated in the accompanying figures, it should be understood that the disclosure may be embodied in many different forms and should not be construed as being limited to the embodiments set forth herein. Rather, these embodiments are provided so that this disclosure will be understood thoroughly and completely and will fully convey the scope of the disclosure to those skilled in the art.

Figure 1:
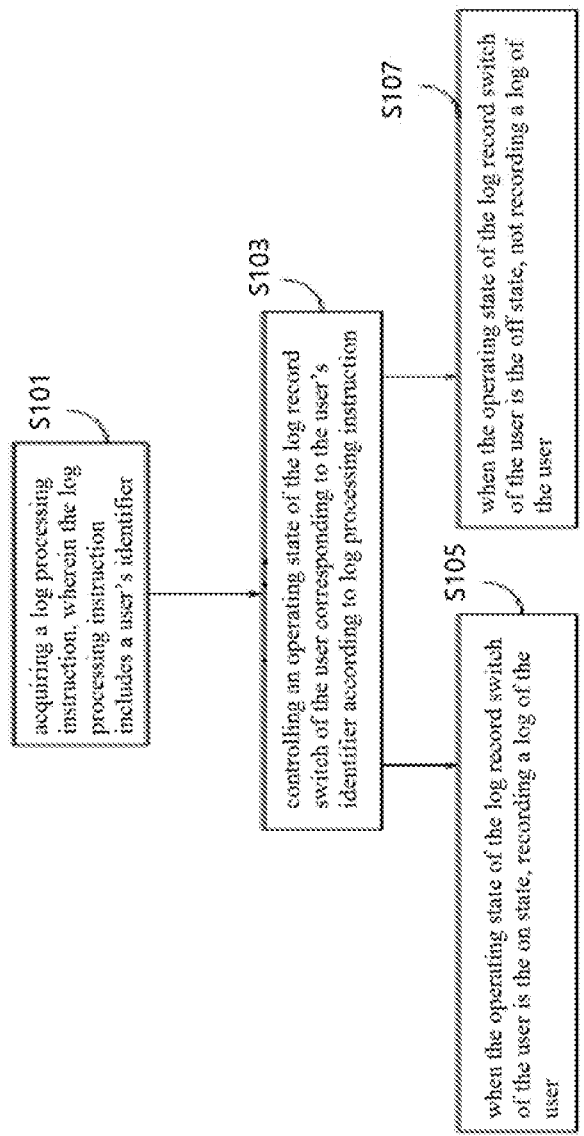
FIG. 1 shows a flow chart of a log processing method according to embodiments of the present disclosure.

As shown in FIG. 1, the flow chart of the log processing method according to embodiments of the present disclosure, the method includes steps as follows.

Step S101, acquiring a log processing instruction, wherein the log processing instruction includes a user's identifier.

In the embodiments of the present disclosure, the log refers to records of some specific events that occurred in the operation of the server, and descriptions of date, time, user, actions and related operations are recorded in each line of the log.

In the embodiments of the present disclosure, the log processing instruction includes an on instruction and an off instruction, wherein the on instruction is used to start recording the log of the user (namely the specified user) corresponding to the user's identifier, for example, an "open_debug" function may be used to indicate the on instruction. The off instruction is used to stop recording the log of the user (namely the specified user) corresponding to the user's identifier, for example, a "close_debug" function may be used to indicate the off instruction. It is of course understandable that specific forms of the on instruction and the off instruction are not limited in the embodiments of the present disclosure.

Optionally, in the embodiments of the present disclosure, the user's identifier that is used for distinguishing each user may be, but is of course not limited to, a cell phone number, a QQ number, an ID number, an account number and the like.

Optionally, in the embodiments of the present disclosure, one user's identifier is assigned to each user, which establishes connection with the server before the step S101. Specifically, a plurality of users establish connections with the server and register for log processing in the server, and then the server can assign an account for each user. When demanding for its log, the user can send a log processing instruction to the server, and the log processing instruction includes the user's account.

Step S103, controlling an operating state of the log record switch of the user corresponding to the user's identifier according to the log processing instruction, and the operating state of the log record switch includes an on state and an off state.

Specifically, the log processing instruction may be divided into the on instruction and the off instruction. When the log processing instruction is the on instruction, the operating state of the log record switch of the user may be controlled at the on state; and when the log processing instruction is the off instruction, the operating state of the log record switch of the user may be controlled at the off state.

Optionally, in the embodiments of the present disclosure, the operating state of the log record switch is saved in a storage of the server. Specifically, a session layer is established between the server and each user, a session state of the session layer may be controlled by the log record switch, and the operating state of the log record switch is set at the off state by default.

Optionally, in the embodiments of the present disclosure, "user_debug_flag" may be employed to indicate the operating state of the log record switch, "user_debug_flag=false" indicates that the operating state of the log record switch is at the off state, and "user_debug_flag=true" indicates that the operating state of the log record switch is at the on state.

For example, the current operating state of the log record switch is "user_debug_flag=false". If the log processing instruction of the user is at the on state (the "open_debug" function) in the step S101, the operating state of the log record switch may be regulated from "user_debug_flag=false" to "user_debug_flag=true" in the step S103, namely, the operating state of the log record witch is regulated to the on state.

The current operating state of the log record switch is "user_debug_flag=true". If the log processing instruction of the user is at the off state (the "close_debug" function) in the step S101, the operating state of the log record switch may be regulated from "user_debug_flag=true" to "user_debug_flag=false" in the step S103, namely, the operating state of the log record witch is regulated to the off state.

In order to realize the above-mentioned functions, for the system of the server, for example, a rule of modifying respective functional module functions of the system of the server for recording the logs is to keep an original parameter passing order of respective functional functions and add a default caller parameter after the last parameter, and the default caller parameter is null in general condition. User event logs in functional modules are output; the log record switch of the specified user is controlled by the "open_debug" function and the "close_debug" function, and variation of the caller parameter is controlled by the log record switch, with an implementation code as follows:

```
open_debug( ) //on instruction
{
user_debug_flag = true;// the operating state of the log record switch
is at the on state
}
close_debug( )//off instruction
{
user_debug_flag = false;// the operating state of the log record switch
is at the off state
}
```

When the operating state of the log record switch of the user is at the on state, go to step S105, where the log of the user is recorded. Namely, the server is controlled to start or continue recording the log of the user corresponding to the user's identifier so as to realize the detailed log recording for the specified user.

When the operating state of the log record switch of the user is at the off state, go to step S107, where the log of the user is not recorded. Namely, the server is controlled to stop recording the log of the user corresponding to the user's identifier so as to prevent the overall performance of the system from being affected due to the server's log recording of a large amount of users.

In another embodiment of the present disclosure, when a large amount of users are online at the same time, detailed logs of some specified users are expected to be recorded, and therefore a system issue may be located or founded based on the recorded logs output by the server. The method 100 may also include the step of recording a log of the system, wherein log levels are separately set for the log of the system and the log of the user, and the higher the log level is, the more detailed the log information is. Specifically, the log level of the log of the user is set to be not higher than that of the log of the system, wherein the higher the log level is, the more detailed the log information is, and namely the log information of the log of the user will not be more detailed than that of the log of the system. Preferably, the log level of the log of the user is set to be the same as that of the log of the system.

The log of the system is to record information of hardware, software and system issues in the system and to monitor events occurring in the system at the same time. The user can use the log of the system to check a reason for an error or to find a trace left by an attacker when the system is attacked.

The log of the user is to record operating information of the user, such as information related to network access (including website and access time) and information related to used applications (including application name and operating time etc.).

For example, existing log levels for the log of the system include four levels (DEBUG, INFO, WARN and ERROR) from the highest to the lowest, wherein the higher the log level is, the more detailed the log information is, and namely the log information at the DEBUG level in the four log levels is the most detailed. In one example, if the log level of the log of the system is at the INFO level, the log level of the log of the user may be set to be any INFO level, WARN level and ERROR level, except for the DEBUG level which is higher than the log level of the system log.

As for server which serve a large number of users, to record a detailed log of a certain specified user in the server is quite helpful for analyzing system issues, and debugging efficiency of a software engineer during system integration is increased effectively.

According to the embodiments of the present disclosure, the log processing method may further include one or more optional steps to realize additional or auxiliary functions. However, the optional steps are not indispensable to realizing the purposes of the present disclosure, and namely the purposes of the present disclosure may be realized absolutely without the optional steps according to the log processing method of the embodiments of the present disclosure. The optional steps are not shown in FIG. 1, but an order to execute the optional steps and the above-mentioned steps may be easily made by a person having an ordinary level of skill in the art based on teachings as follows. It is necessary to point out that the order to execute the optional steps together with the above-mentioned steps is selectable according to practical requirements, except for any particular instruction.

Figure 2:
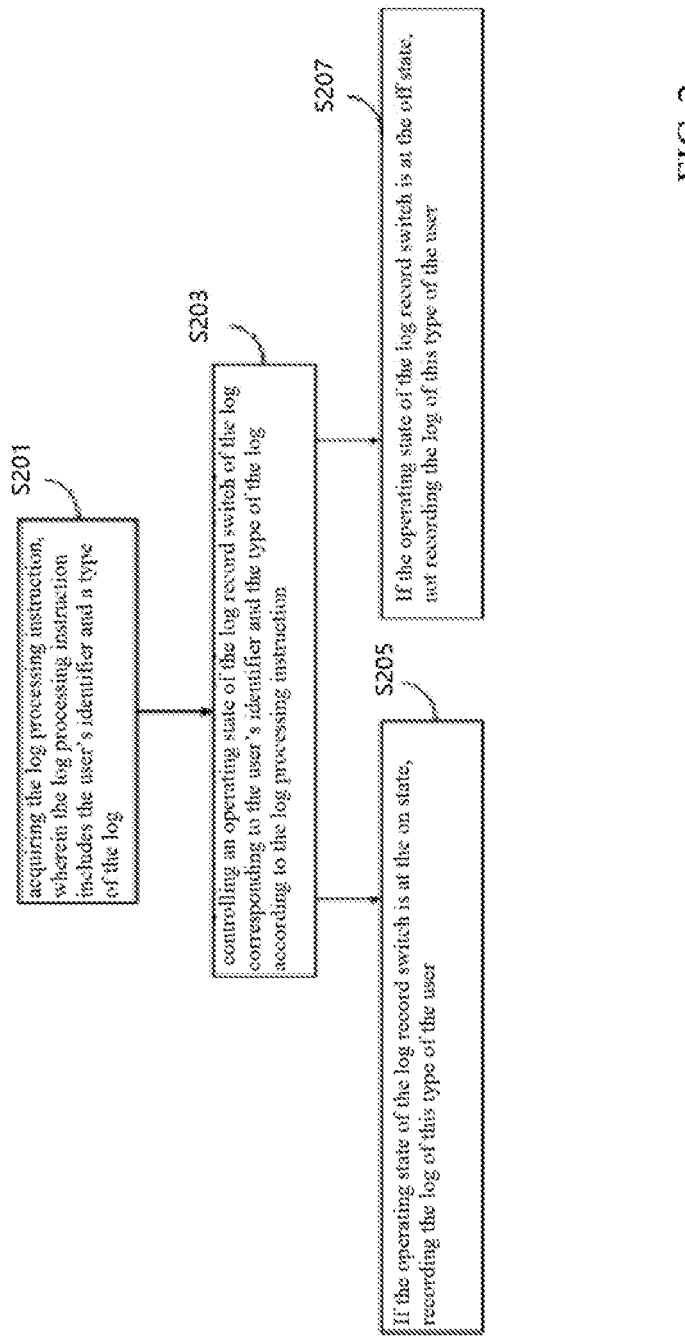
FIG. 2 shows a flow chart of another log processing method according to embodiments of the present disclosure.

In another embodiment of the present disclosure, the log processing instruction may be set to record a log that is not based on each different function of the specified user, and this embodiment is different from the above-mentioned embodiment in that the log processing instruction includes a different parameter. FIG. 2 shows a flow chart of another log processing method according to embodiments of the present disclosure, the log processing method including:

Step S201, acquiring the log processing instruction, wherein the log processing instruction includes the user's identifier and a type of the log, wherein the type of the log includes an application log, a security log, a system log, an FTP (File Transfer Protocol) log, a WWW (World Wide Web) log, a DNS (Domain Name Server) log and the like.

In the embodiments of the present disclosure, the log processing instruction includes the on instruction and the off instruction, wherein the on instruction is used to start recording the log of the user (namely the specified user) corresponding to the user's identifier, for example, an "open_debug" function may be used to indicate the on instruction. The off instruction is used to stop recording the log of the user (namely the specified user) corresponding to the user's identifier, for example, a "close_debug" function may be used to indicate the off instruction. It is of course understandable that specific forms of the on instruction and the off instruction are not limited in the embodiments of the present disclosure.

Optionally, in the embodiments of the present disclosure, the user's identifier that is used for distinguishing each user may be, but is of course not limited to, a cell phone number, a QQ number, an ID number, an account number and the like.

Step S203, controlling an operating state of the log record switch of the log corresponding to the user's identifier and the type of the log according to the log processing instruction. If the operating state of the log record switch is at the on state, go to step S205 of recording the log, of this type, of the user. If the operating state of the log record switch is at the off state, go to step S207 of not recording the log, of this type, of the user.

Specifically, the log processing instruction may be divided into the on instruction and the off instruction. When the log processing instruction is the on instruction, the operating state of the log record switch of the user may be controlled at the on state; and when the log processing instruction is the off instruction, the operating state of the log record switch of the user may be controlled at the off state.

Optionally, in the embodiments of the present disclosure, the operating state of the log record switch is saved in a storage of the server. Specifically, a session layer is established between the server and each user, a session state of the session layer may be controlled by the log record switch, and the operating state of the log record switch is set at the off state by default.

Optionally, in the embodiments of the present disclosure, "user_debug_flag" may be employed to indicate the operating state of the log record switch, "user_debug_flag=false" indicates that the operating state of the log record switch is at the off state, and "user_debug_flag=true" indicates that the operating state of the log record switch is at the on state.

According to the embodiments of the present disclosure, the log processing method may further include one or more optional steps to realize additional or auxiliary functions. However, the optional steps are not indispensable to realize purposes of the present disclosure, and namely the purposes of the present disclosure may be realized absolutely without the optional steps according to the log processing method of the embodiments of the present disclosure. The optional steps are not shown in FIG. 2, but an order to execute the optional steps and the above-mentioned steps may be easily made by a person having an ordinary level of skill in the art based on teachings as follows. It is necessary to point out that the order to executing the optional steps together with the above-mentioned steps is selectable according to practical requirements, except for any particular instruction.

Figure 3:
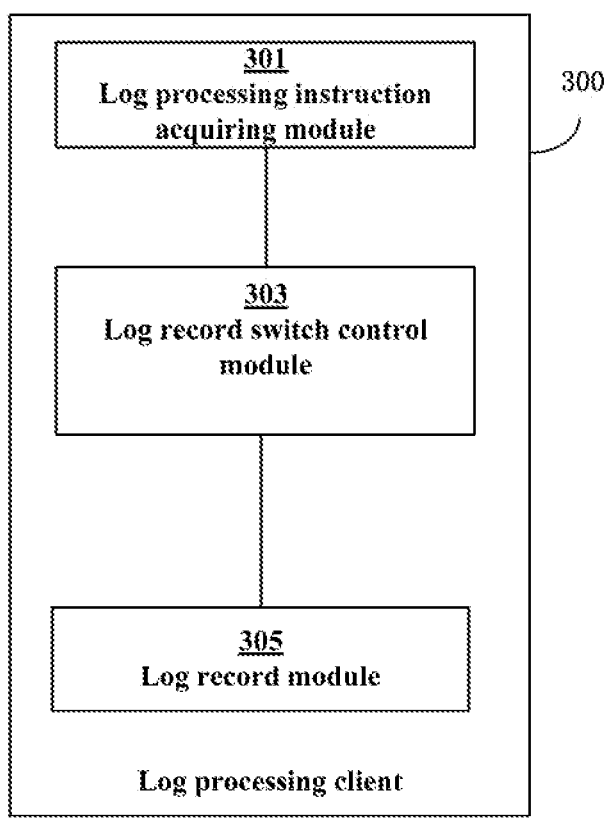
FIG. 3 shows a structural block diagram of a log processing client according to embodiments of the present disclosure.

FIG. 3 shows a structural block diagram of a log processing client according to embodiments of the present disclosure. The log processing client 300 includes a log processing instruction acquiring module 301, a log record switch control module 303 and a log record module 305. It is understandable that the connection means of the respective modules as shown in FIG. 3 is only an example; a person having an ordinary level of skill in the art can absolutely employ other connection means provided that the respective modules can also realize functions of the present disclosure by such connection means.

In the specification, functions of the respective modules may be realized by means of a specific hardware or a hardware which can execute the processing in combination with appropriate software. Such hardware or specific hardware may include an ASIC (Application Specific Integrated Circuit), other respective circuits, respective processors and the like. When a processor is employed, the functions may be provided by a single specific processor, a single share processor or a plurality of independent processors (some of which may be shared). In addition, the processor should not be interpreted as a specific hardware which can execute the software, and may implicitly include, but not be limited to, DSP (Digital Signal Processor) hardware, an ROM (Read Only Memory) for software storage, an RAM (Random Access Memory) and a non-volatile memory device.

In the embodiments of the present disclosure, the log processing instruction acquiring module 301 is used for acquiring the log processing instruction, wherein the log processing instruction includes the user's identifier. In the embodiments of the present disclosure, the log refers to records of some specific events that have occurred in the operation of the server, and descriptions of date, time, user, actions and related operations are recorded in each line of the log. In the embodiments of the present disclosure, the log processing instruction includes an on instruction and an off instruction, wherein the on instruction is used to start recording the log of the user (namely the specified user) corresponding to the user's identifier, for example, an "open_debug" function may be used to indicate the on instruction. The off instruction is used to stop recording the log of the user (namely the specified user) corresponding to the user's identifier, for example, a "close_debug" function may be used to indicate the off instruction. It is of course understandable that specific forms of the on instruction and the off instruction are not limited in the embodiments of the present disclosure.

In the embodiments of the present disclosure, the log record switch control module 303 is used for controlling the operating state of the log record switch of the user corresponding to the user's identifier according to the log processing instruction, and the operating state of the log record switch includes the on state and the off state.

In the embodiments of the present disclosure, the log record module 305 is used for recording the log of the user when the operating state of the log record switch of the user is at the on state and not recording the log of the user when the operating state of the log record switch of the user is at the off state. As for servers which serve a large number of users, to acquire a detailed log of a certain specified user from the server is quite helpful for analyzing system issues, and debugging efficiency of a software engineer in system integration is increased effectively.

Figure 4:
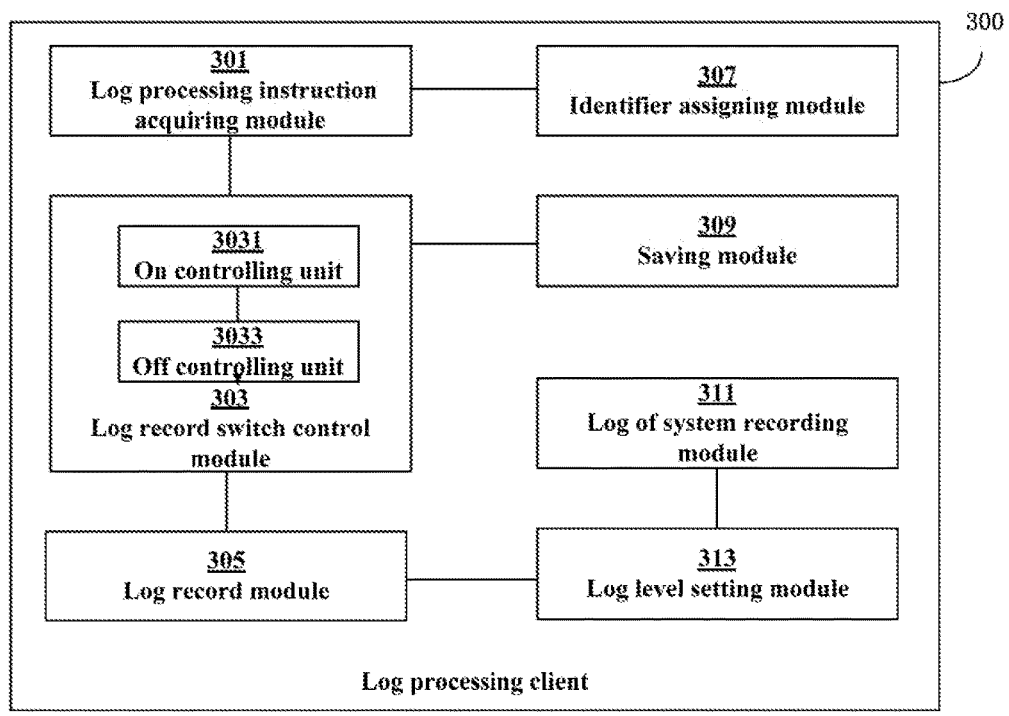
FIG. 4 shows a structural block diagram of another log processing client according to embodiments of the present disclosure.

FIG. 4 shows a structural block diagram of another log processing client of the present disclosure. Optionally, in the embodiments of the present disclosure, the log processing client 300 further includes an identifier assigning module 307, configured to assign the user's identifier to each user which establishes connection with the server. Optionally, in the embodiments of the present disclosure, the user's identifier that is used for distinguishing each user may be, but is of course not limited to, a cell phone number, a QQ number, an ID number and the like.

In the embodiments of the present disclosure, the log processing instruction may be divided into the on instruction and the off instruction. The log record switch control module 303 includes:

an on controlling unit 3031, configured to control the operating state of the log record switch of the user to be at the on state when the log processing instruction is the on instruction; and an off controlling unit 3033, configured to control the operating state of the log record switch of the user to be at the off state when the log processing instruction is the off instruction. When the log processing instruction is the on instruction, the operating state of the log record switch of the user may be controlled at the on state; and when the log processing instruction is the off instruction, the operating state of the log record switch of the user may be controlled at the off state. Optionally, in the embodiments of the present disclosure, "user_debug_flag" may be employed to indicate the operating state of the log record switch, "user_debug_flag=false" indicates that the operating state of the log record switch is at the off state, and "user_debug_flag=true" indicates that the operating state of the log record switch is at the on state.

Optionally, in the embodiments of the present disclosure, the log processing client 300 further includes a saving module 309, configured to save the operating state of the log record switch in the storage of the server.

Optionally, in the embodiments of the present disclosure, the log processing client 300 further includes:

a log of system recording module 311, configured to record the log of the system; and a log level setting module 313, configured to set the log level of the log of the user to be not higher than the log level of the log of the system, wherein the higher the log level is, the more detailed log information is.

For example, existing log levels for the log of the system include four levels (DEBUG, INFO, WARN and ERROR) from the highest to the lowest, wherein the higher the log level is, the more detailed the log information is, and namely the log information at the DEBUG level in the four log levels is the most detailed. In one example, if the log level of the log of the system is at the INFO level, the log level of the log of the user may be set to be any of INFO level, WARN level and ERROR level, except for the DEBUG level which is higher than the log level of the system log.

According to the above technical solution, embodiments of the present disclosure have the following beneficial effects: in embodiments of the present disclosure, an operating state of a log record switch of a user may be controlled based on a log processing instruction. When the operating state of the log record switch of the user is at the on state, a recording of a log of the user corresponding to the user's identifier starts or continues so as to realize detailed log a recording for a specified user. When the operating state of the log record switch of the user is at the off state, the recording of the log of the user corresponding to the user's identifier stops so as to prevent the overall performance of the system from being affected due to the logs of a large number of users who are being recorded by the server.

Each of devices according to the embodiments of the disclosure can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the modules in the apparatus in the log processing client according to the embodiments of the disclosure. The disclosure may further be implemented as device program (for example, computer program and computer program product) for executing some or all of the methods as described herein. Such program for implementing the disclosure may be stored in the computer readable medium, or have a form of one or more signals. Such a signal may be downloaded from the internet websites, or be provided in carrier, or be provided in other manners.

Figure 5:
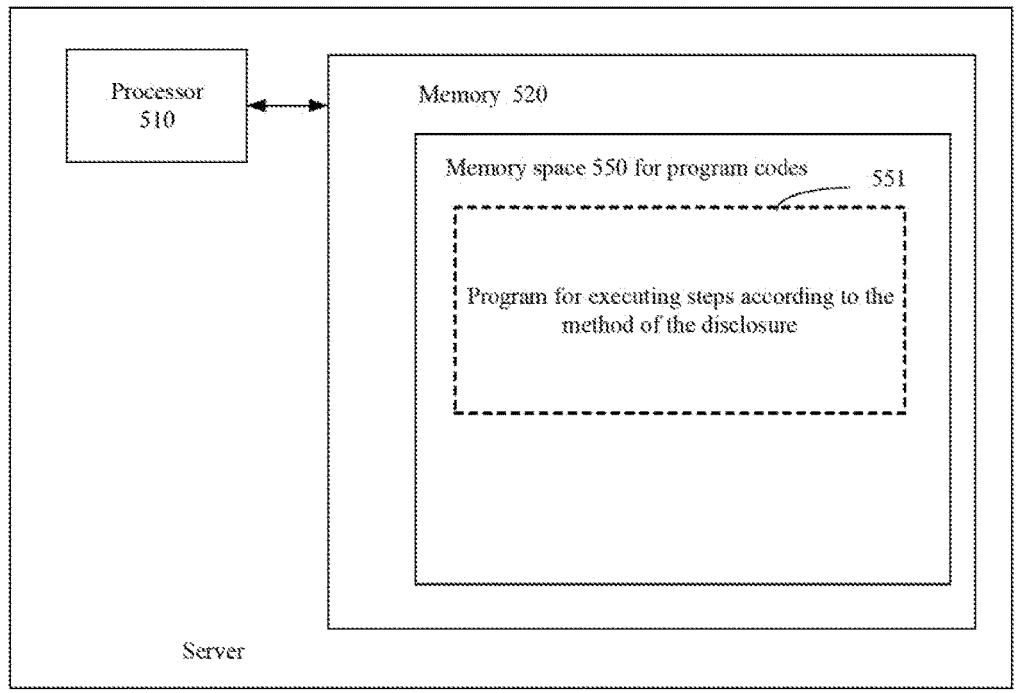
FIG. 5 schematically shows a block diagram of a server for executing the method according to the present disclosure.
Figure 6:
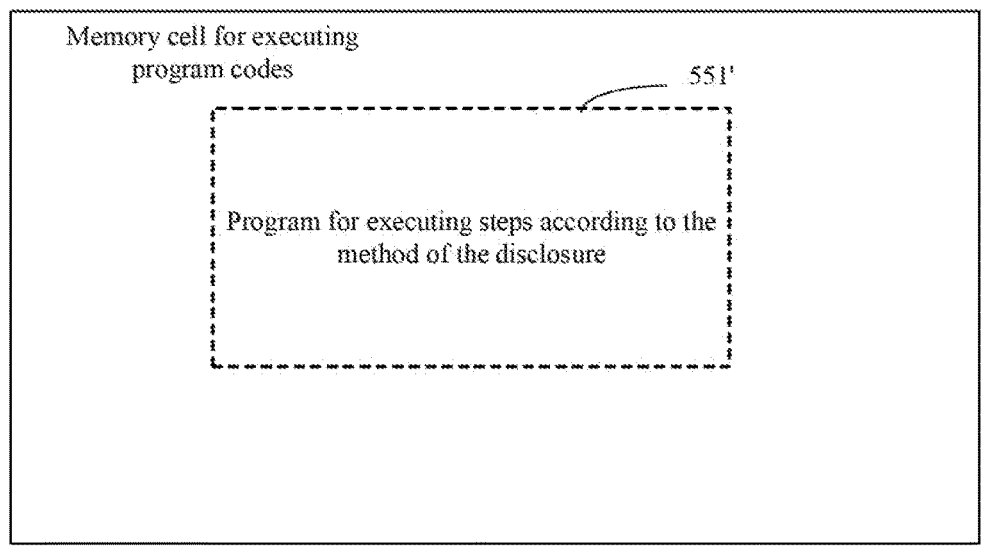
FIG. 6 schematically shows a memory cell for keeping or carrying a program code which can realize the method according to the present disclosure.

For example, FIG. 5 illustrates a block diagram of a server for executing the method according the disclosure, such as a search engine server. Traditionally, the server includes a processor 510 and a computer program product or a computer readable medium in form of a memory 530. The memory 530 could be electronic memories such as flash memory, EEPROM (Electrically Erasable Programmable Read-Only Memory), EPROM, hard disk or ROM. The memory 530 has a memory space 550 for executing program codes 551 of any steps in the above methods. For example, the memory space 550 for program codes may include respective program codes 551 for implementing the respective steps in the method as mentioned above. These program codes may be read from and/or be written into one or more computer program products. These computer program products include program code carriers such as hard disk, compact disk (CD), memory card or floppy disk. These computer program products are usually the portable or stable memory cells as shown in reference FIG. 6. The memory cells may be provided with memory sections, memory spaces, etc., similar to the memory 550 of the server as shown in FIG. 5. The program codes may be compressed for example in an appropriate form. Usually, the memory cell includes computer readable codes 551' which can be read for example by processors 510. When these codes are operated on the server, the server may execute respective steps in the method as described above.

The "an embodiment", "embodiments" or "one or more embodiments" mentioned in the disclosure means that the specific features, structures or performances described in combination with the embodiment(s) would be included in at least one embodiment of the disclosure. Moreover, it should be noted that, the wording "in an embodiment" herein may not necessarily refer to the same embodiment.

Many details are discussed in the specification provided herein. However, it should be understood that the embodiments of the disclosure can be implemented without these specific details. In some examples, the well-known methods, structures and technologies are not shown in detail so as to avoid an unclear understanding of the description.

It should be noted that the above-described embodiments are intended to illustrate but not to limit the disclosure, and alternative embodiments can be devised by the person skilled in the art without departing from the scope of claims as appended. In the claims, any reference symbols between brackets form no limit of the claims. The wording "include" does not exclude the presence of elements or steps not listed in a claim. The wording "a" or "an" in front of an element does not exclude the presence of a plurality of such elements. The disclosure may be realized by means of hardware comprising a number of different components and by means of a suitably programmed terminal device. In the unit claim listing a plurality of devices, some of these devices may be embodied in the same hardware. The wordings "first", "second", and "third", etc. do not denote any order. These wordings can be interpreted as a name.

Also, it should be noticed that the language used in the present specification is chosen for the purpose of readability and teaching, rather than explaining or defining the subject matter of the disclosure. Therefore, it is obvious for an ordinary skilled person in the art that modifications and variations could be made without departing from the scope and spirit of the claims as appended. For the scope of the disclosure, the publication of the inventive disclosure is illustrative rather than restrictive, and the scope of the disclosure is defined by the appended claims.

What is claimed is:

1. A method for improving log level control of a system including a server and a plurality of users, comprising:
   acquiring a log processing instruction, the log processing instruction including a user's identifier and an on or off instruction, wherein the user is among the plurality of users that establish connections with the server;
   controlling an operating state of a log record switch of the user corresponding to the user's identifier according to the log processing instruction, the operating state of the log record switch including an on state and an off state, wherein the controlling an operating state of a log record switch of the user corresponding to the user's identifier according to the log processing instruction further comprises:
      controlling the operating state of the log record switch of the user to be the on state when the log processing instruction is the on instruction, and
      controlling the operating state of the log record switch of the user to be the off state when the log processing instruction is the off instruction;
   when the operating state of the log record switch of the user is the on state, recording a log of the user based on a corresponding log level of the user, wherein the corresponding log level of the user is predetermined among a plurality of log levels, more detailed information is recorded for the log of the user when the corresponding log level is a higher log level, the corresponding log level of the user is equal to or lower than a log level of the server, the corresponding log level of the user is stored in the server;
   when the operating state of the log record switch of the user is the off state, not recording a log of the user;
   wherein the method further comprises:
   establishing a session layer between the server and each of the plurality of users; and
   controlling a session state of the session layer by a corresponding log record switch.

2. The method according to claim 1, further comprising: assigning the user's identifier to the user which establishes a connection with the server.

3. The method according to claim 1, further comprising: saving the operating state of the log record switch in a storage of the server.

4. The method according to claim 1, wherein the log processing instruction further comprises a type of the log; the step of controlling the operating state of the log record switch of the user corresponding to the user's identifier according to the log processing instruction is:
   controlling the operating state of the log record switch of the log corresponding to the user's identifier and the type of the log according to the log processing instruction.

5. A non-transitory computer readable medium having computer programs stored thereon that, when executed by one or more processors of a computing system, cause the computing system to perform:
   acquiring a log processing instruction, the log processing instruction including a user's identifier and an on or off instruction, wherein the user is among a plurality of users that establish connections with the server;
   controlling an operating state of a log record switch of the user corresponding to the user's identifier according to the log processing instruction, the operating state of the log record switch including an on state and an off state, wherein the controlling an operating state of a log record switch of the user corresponding to the user's identifier according to the log processing instruction further comprises:
controlling the operating state of the log record switch of the user to be the on state when the log processing instruction is the on instruction, and
controlling the operating state of the log record switch of the user to be the off state when the log processing instruction is the off instruction;
when the operating state of the log record switch of the user is the on state, recording a log of the user based on a corresponding log level of the user, wherein the corresponding log level of the user is predetermined among a plurality of log levels, more detailed information is recorded for the log of the user when the corresponding log level is a higher log level, the corresponding log level of the user is equal to or lower than a log level of the server, the corresponding log level of the user is stored in the server;
when the operating state of the log record switch of the user is the off state, not recording a log of the user;
wherein the non-transitory computer readable medium further comprises instructions that, when executed by the one or more processors, cause the computing system server to perform:
establishing a session layer between the server and each of the plurality of users; and
controlling a session state of the session layer by a corresponding log record switch.

6. A system, comprising:
at least a processor; and
at least a memory communicatively coupled to the at least a processor and storing instructions that upon execution by the at least processor cause the system to:
acquire a log processing instruction, the log processing instruction including a user's identifier and an on or off instruction, wherein the user is among a plurality of users that establish connections with a server;
control an operating state of a log record switch of the user corresponding to the user's identifier according to the log processing instruction, the operating state of the log record switch including an on state and an off state, wherein the controlling an operating state of a log record switch of the user corresponding to the user's identifier according to the log processing instruction further comprises:
controlling the operating state of the log record switch of the user to be the on state when the log processing instruction is the on instruction, and
controlling the operating state of the log record switch of the user to be the off state when the log processing instruction is the off instruction;
when the operating state of the log record switch of the user is the on state, record a log of the user based on a corresponding log level of the user, wherein the corresponding log level of the user is predetermined among a plurality of log levels, more detailed information is recorded for the log of the user when the corresponding log level is a higher log level, the corresponding log level of the user is equal to or lower than a log level of the server, the corresponding log level of the user is stored in the server; and
not record the log of the user when the operating state of the log record switch of the user is the off state;
wherein the at least a memory further stores instructions that upon execution by the at least processor cause the system to:
establish a session layer between the server and each of the plurality of users; and
control a session state of the session layer by a corresponding log record switch.

7. The system according to claim 6, wherein the at least a processor is further configured to perform:
assigning a user identifier to each user which establishes a connection with the server.

8. The system according to claim 6, wherein the at least a processor is further configured to perform:
saving the operating state of the log record switch in a storage of the server.

9. The system according to claim 6, wherein the log processing instruction further comprises a type of the log;
the controlling the operating state of the log record switch of the user corresponding to the user's identifier according to the log processing instruction is:
controlling the operating state of the log record switch of the log corresponding to the user's identifier and the type of the log according to the log processing instruction.

* * * * *